(12) United States Patent
Lee et al.

(10) Patent No.: US 8,378,807 B2
(45) Date of Patent: Feb. 19, 2013

(54) BLUETOOTH COMMUNICATION METHOD AND SYSTEM

(75) Inventors: Eun Kyoung Lee, Gyeonggi-do (KR); Eui Soon Park, Gyeonggi-do (KR); Sung Kyu Park, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 363 days.

(21) Appl. No.: 12/858,543

(22) Filed: Aug. 18, 2010

(65) Prior Publication Data

US 2011/0063103 A1    Mar. 17, 2011

(30) Foreign Application Priority Data

Sep. 11, 2009    (KR) .................. 10-2009-0085961

(51) Int. Cl.
*G08B 26/00* (2006.01)
(52) U.S. Cl. ........ 340/505; 340/502; 340/517; 340/522; 340/5.81; 340/5.84; 340/10.33; 340/10.52; 455/41.2; 455/418; 455/456.6
(58) Field of Classification Search .................. 340/505, 340/502, 517, 522, 5.81, 5.85, 10.33, 10.52; 455/41.2, 518, 456.6
See application file for complete search history.

(56) References Cited

U.S. PATENT DOCUMENTS

| 6,757,318 B1 * | 6/2004 | Ziegler et al. ................. 375/133 |
| 8,090,364 B2 * | 1/2012 | Delalat .......................... 455/420 |
| 8,150,322 B2 * | 4/2012 | Lin ............................... 455/41.2 |

FOREIGN PATENT DOCUMENTS

KR    2003-24058    3/2003

* cited by examiner

*Primary Examiner* — Tai T Nguyen
(74) *Attorney, Agent, or Firm* — Cha & Reiter, LLC

(57) ABSTRACT

A Bluetooth connection establishment method and system is provided for facilitating establishment of a communication channel between a master device and a target slave device. The method has the steps of broadcasting an inquiry signal for discovering a slave device and transmitting an inquiry response signal. The inquiry response signal is communicated from the slave device to a master device and the inquiry response signal indicates that the inquiry signal has been received by the slave device. The method requests at the master device that the at least one slave device transmits identification information. A slave device list is displayed. An alarm is transmitted by the at least one slave device that received the inquiry signal and a second alarm is transmitted by a target slave device selected from the slave device list in response to an alarm trigger signal transmitted by the master device.

21 Claims, 6 Drawing Sheets

BLUETOOTH COMMUNICATION METHOD AND SYSTEM

CLAIM OF PRIORITY

This application claims the benefit under 35 U.S.C. §119 (a) of a Korean patent application filed in the Korean Intellectual Property Office on Sep. 11, 2009 and assigned Serial No. 10-2009-0085961, the entire disclosure of which is hereby incorporated by reference.

BACKGROUND OF THE INVENTION

1. Field of the Invention

The present invention relates to Bluetooth™ communications. More particularly, the present invention relates to a method of establishing a Bluetooth™ communication channel between a master device and a target slave device.

2. Description of the Related Art

With the rapid development of electronics and communication technologies, the mobile terminal has become one of essential tools in everyday life. Recent mobile phones are equipped with various functions. These functions may include playing music, sending text messages, taking pictures using a camera, and Bluetooth™ communication functions. These functions are in addition to the basic telephone voice communication function. Bluetooth™ is an open wireless technology standard for exchanging data over short distances (using short length radio waves) from fixed and mobile devices, creating personal area networks (PANs) with high levels of security. Created by telecoms vendor Ericsson™ in 1994, the communication protocol was originally conceived as a wireless alternative to RS-232 data cables. The communication protocol can be used, for example, to connect several devices, overcoming problems of synchronization.

Bluetooth™ is one of the short range radio frequency technologies for establishing communication links between Bluetooth™-enabled devices within the Bluetooth™ radio coverage range. In the basic Bluetooth™ connection establishment procedure of a mobile terminal, the mobile terminal scans a predetermined area to discover Bluetooth™ devices within the Bluetooth™ radio range and displays a list of the discovered Bluetooth™ devices on a display associated with the mobile terminal. The user can select a Bluetooth™ enabled device from the list on a display associated with the mobile terminal so as to establish a Bluetooth™ connection through a process called pairing. However, the conventional Bluetooth™ link establishment procedure has several drawbacks. First of all, the device discovery process continues even when a target Bluetooth device is found. This is due to the fact that the discovery process will continue until a predetermined discovery time expires. At the conclusion of the time period, the discovery process expires and does not expire when the target device is located. This extra discovery process may result, in an unnecessary waste of time and power and may reduce the mobile terminal battery life. Battery life is a critical factor in selecting a communication device to a consumer.

Also, another problem is that in the conventional Bluetooth™ link establishment procedure, the mobile terminal displays a list of available devices with the model names of the found devices. If there are several devices with the same model names it may not be easy for the user to identify the desired target Bluetooth™ device and the user may inadvertently select the incorrect device by accident. This may occur particularly when there are Bluetooth devices having the same model name. This can be inconvenient and may cause the user to repeat the pairing device a second time.

SUMMARY OF THE INVENTION

In order to solve the problems of the prior art, the present disclosure provides a Bluetooth™ connection establishment method and system that enables the user to identify a target Bluetooth™ device which has received the inquiry signal transmitted by the mobile terminal with the assistance of at least one of visual, auditory, and tactile alarms indicating receipt of the inquiry signal.

Also, the present disclosure provides a Bluetooth™ connection establishment method and system that enables the user to identify the target slave device which has received an alarm trigger signal. The alarm trigger signal is transmitted by a master Bluetooth device. The device that receives the alarm trigger signal provides at least one of visual, auditory, and tactile alarm indicating receipt of the alarm trigger signal.

In accordance with an aspect of the present disclosure, a Bluetooth connection establishment method is provided. The method has the steps of broadcasting an inquiry signal for discovering at least one slave device and transmitting an inquiry response signal. The inquiry response signal is communicated from the at least one slave device to a master device and the inquiry response signal indicates that the inquiry signal has been received by the at least one slave device. The method requests at the master device that the at least one slave device transmits identification information. A slave device list includes the at least one slave device that transmitted the inquiry response signal. An alarm is transmitted by the at least one slave device that received the inquiry signal. A second alarm is transmitted by a target slave device selected from the slave device list and in response to an alarm trigger signal transmitted by the master device.

In accordance with another aspect of the present disclosure there is provided a system. The system has a master device transmitting an inquiry signal for discovering at least one slave device; and a first slave device that receives the inquiry signal and transmits an inquiry response signal to the master device, wherein the master device requests an identification information to at least one slave device, receives an identification information from at least one slave device, outputs a slave device list associated with the at least one slave device on a display, and transmits an alarm trigger signal to at least one slave device selected from the slave device list on the display; and the first slave device outputs an alarm upon receipt of at least one of the inquiry signal and the alarm trigger signal.

In accordance with other aspect of the present disclosure there is provided a system. The system for establishing a connection comprises a first device comprising a first controller, a first memory, an input device, a display, and a first radiofrequency communication device; a second device comprising a second controller, a second memory, a second radiofrequency communication device and an indicator; the first device communicating an inquiry signal to the second device; the second device communicating in response to the inquiry signal a second signal, the second signal being an inquiry response signal; the display outputting data associated with second device and at least a third device; wherein upon selecting the second device on the display an alarm request signal is transmitted from the first device to the second device and in response to the alarm request signal the second device provides an indication; and wherein upon selecting the third device on the display an alarm request signal is transmitted from the first device to the third device and in response to the alarm request signal the third device provides the indication.

In accordance with another aspect of the present disclosure, a connection establishment method is provided. The method for establishing a connection comprises the steps of transmitting an inquiry signal for discovering a first device; transmitting an inquiry response signal, the inquiry response signal being communicated from the first device to a second device, the inquiry response signal indicating that the inquiry signal has been received by the first device; requesting, at the second device, that the at least one first device transmit identification information to pair with the second device; and outputting an alarm in response to an alarm trigger signal transmitted by the first or the second device.

BRIEF DESCRIPTION OF THE DRAWINGS

The above and other aspects, features and advantages of certain exemplary embodiments of the present invention will be more apparent from the following description taken in conjunction with the accompanying drawings, in which.

DETAILED DESCRIPTION OF THE INVENTION

Hereinafter, exemplary embodiments of the present disclosure are described in detail with reference to the accompanying drawings. The same reference symbols are used throughout the drawings to refer to the same or similar parts. Detailed descriptions of well-known functions and structures incorporated herein may be omitted to avoid obscuring appreciation of the subject matter of the present disclosure by a person of ordinary skill in the art. Particular terms may be defined to describe the disclosure in the best manner. Accordingly, the meaning of specific terms or words used in the specification and the claims should not be limited to the literal or commonly employed sense, but should be construed in accordance with the spirit of the disclosure as understood by a person of ordinary skill in the art. The description of the various exemplary embodiments is to be construed as illustrative only and does not describe every possible instance of the claimed disclosure. Therefore, it should be understood that various changes may be made and equivalents may be substituted that are within the spirit and the scope of the presently claimed disclosure.

Prior to the description of the present disclosure, an explanation is made of Bluetooth™ as relevant background information. Bluetooth™ is designed for low power consumption with a short range of 10 meters (which can be extended to 100 meters). According to the Bluetooth™ (hereinafter "Bluetooth") standard, the voice packets can be transmitted at 64 kbps on symmetric channel, and the data packets can be transmitted at the data rate of up to 723.2 kbps on asymmetric channel. Bluetooth uses a radio technology called frequency hopping spread spectrum, which improves security as compared to other conventional radio communication protocols, and employs a Continuous Variable Slope Delta (CVSD) modulation scheme for voice transmission and text data transmission.

On the basis of the above described Bluetooth concept, a Bluetooth communication system and method according to an exemplary embodiment of the present disclosure is described hereinafter. A description of the Bluetooth communication according to an exemplary embodiment of the present disclosure is described hereinafter with reference to FIG. 1.

Figure 1:
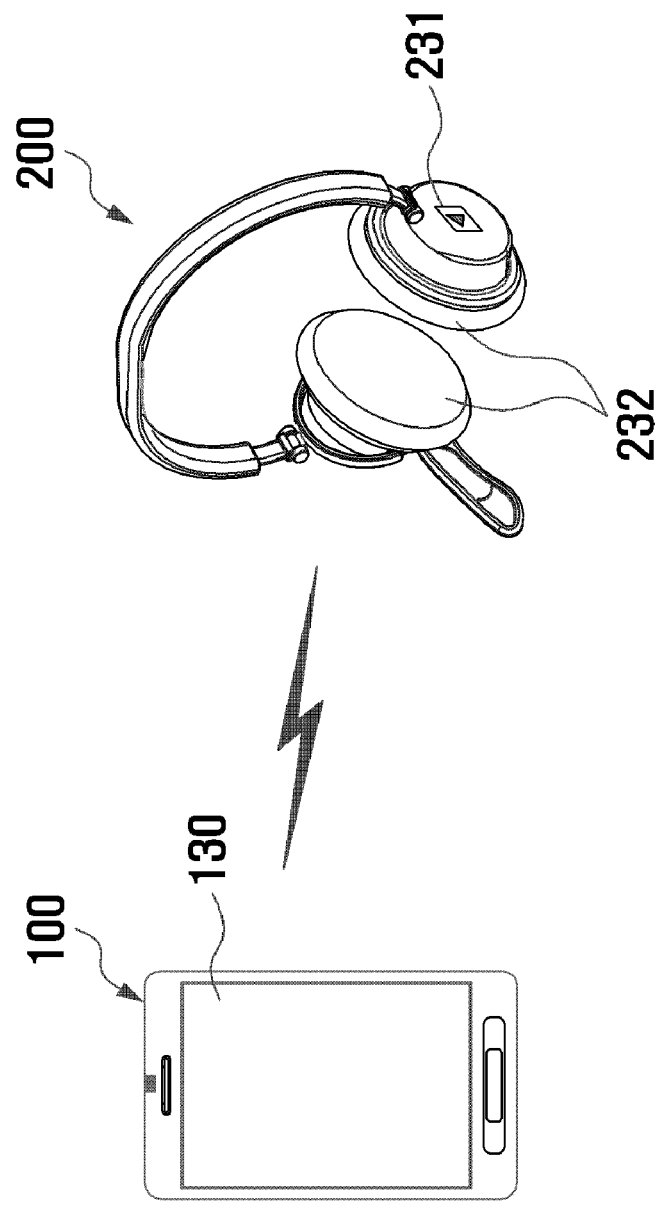
FIG. 1 is a schematic diagram illustrating a Bluetooth communication system according to an exemplary embodiment of the present disclosure.

FIG. 1 is a schematic diagram illustrating a Bluetooth communication system according to an exemplary embodiment of the present disclosure.

As shown in FIG. 1, the Bluetooth communication system according to an exemplary embodiment of the present invention includes a mobile terminal 100 and a headset 200. It should be understood that the handset 100 and the headset 200 may be spaced from one another.

Although the following description is made under the assumption that the mobile terminal 100 is a master device and the headset 200 is a slave device, the present disclosure is not limited thereto. For example, the mobile terminal 100 can act as a slave device, and the headset 200 as a master or slave device.

In the Bluetooth communication system structured as shown in FIG. 1, the master device, i.e. the mobile terminal 100, transmits at least one of an inquiry signal and an alarm trigger signal, and the slave device, i.e. the headset 200, sounds or provides an alarm in response to the alarm trigger signal in a predetermined manner.

If a Bluetooth connection search is requested by the user, then the mobile terminal 100 activates a Bluetooth module. The mobile terminal 100 Bluetooth module then broadcasts an inquiry signal for predetermined time duration. If the inquiry signal is received by the headset 200, then the headset 200 activates an alarm unit (not shown). The alarm unit (not shown) then provides an indication such that the user can identify, with at least one of visual, auditory, and tactile indication that the headset 200 has received the inquiry signal. For example, the headset 200 can be configured to blink a Light Emitting Diode (LED) 231 for a predetermined time duration when it receives the inquiry signal to provide the indication that the signal has been successfully received. Also, the headset 200 can be configured to output a predetermined audio sound or chime through a speaker (not shown) to provide the indication that the signal has been successfully received. Also, the headset 200 can be configured to generate a vibration by a vibration motor (not shown). Therefore, the vibration may provide the indication that the inquiry signal has been received by the headset 200. With the alarm output by the headset 200, the user can recognize that the headset 200 has received the inquiry signal and may then stop transmission of the inquiry signal. In this manner, once the user has detected the indication then by turning off the inquiry signal, the user can stop the inquiry and thus reducing the search time and conserving the power of the mobile terminal 100.

The headset 200 can transmit an inquiry response message to the mobile terminal 100 in response to the inquiry signal. Upon receipt of the inquiry response message, the mobile terminal 100 can request the headset 200 to transmit identification information. The identification information can include at least one of (i) a Bluetooth address (BD_ADDR) as a unique device address data identification information; (ii) a Class of Device data identification information; (iii) a Page Scan Repetition Mode data identification information; (iv) a Page Scan Mode data identification information; (v) a Clock Offset data identification information; and (vi) a Model name identification information. The mobile terminal 100 can be configured such that, when the identification information is received from the headset 200, an identification or the model name of the headset 200 is displayed.

Although only the headset 200 is depicted as a slave device in FIG. 1, there may be more than one slave device or multiple slave devices within the Bluetooth radio range of the mobile terminal 100. In this case, the mobile terminal 100 can display a list of the found slave devices sorted out in order of their model names. A problem exists in the art in that it may not be easy for the user to distinguish between the slave devices only using model names. Particularly when multiple slave devices have the same model name are discovered within the Bluetooth range using the model name alone the user may select and pair with the wrong and incorrect device and confusion may result.

The mobile terminal 100 can establish the Bluetooth communication channel with a slave device 200 selected by the user from a device list displayed on a display 130 through a pairing process. The mobile terminal 100 can transmit an alarm trigger signal to the slave device 200 selected by the user from the device list displayed on the display unit 130. The mobile terminal 100 can be configured such that, when a specific device 200 is selected from the device list, the alarm trigger signal is automatically transmitted to the selected device. The mobile terminal 100 also can be configured such that the alarm trigger signal is transmitted in response to an alarm trigger signal transmission request command. The transmission request command is input by the user.

If the alarm trigger signal is received, the slave device 200 activates its alarm unit (not shown). The alarm unit will be activated to provide an indication. The indication is made in response to the alarm trigger signal such that the user can identify the device with at least one of visual, auditory, and tactile alarms. The user may then control the mobile terminal 100 to establish a Bluetooth communication channel with the target Bluetooth device in an accurate manner.

The Bluetooth communication system according to an exemplary embodiment of the present disclosure has been described hereinabove. A description is made of the configurations of the mobile terminal 100 and the headset 200 in more detail hereinafter.

Figure 2A:
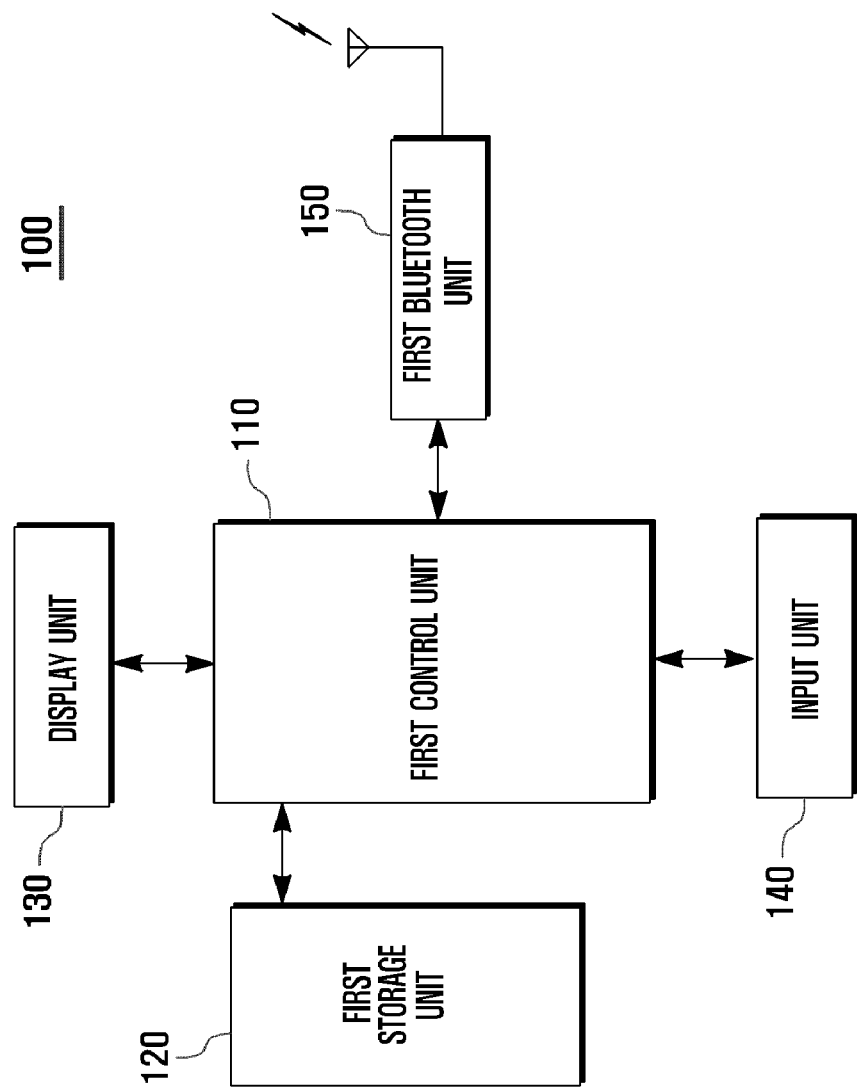
FIG. 2a is a block diagram illustrating a configuration of the mobile terminal of FIG. 1.

FIG. 2a is a block diagram illustrating a configuration of the mobile terminal of FIG. 1. As shown in FIG. 2a, the mobile terminal 100 includes a first control unit 110, a first storage unit 120, an input unit 140, a first Bluetooth unit 150, and a display unit 130. The first control unit 110 is connected to the display unit 130, the first storage unit 120, the first Bluetooth unit 150 and the input unit 140. The first Bluetooth unit 150 preferably includes an RF device and an antenna.

The input unit 140 is provided with a plurality of alphanumeric keys for receiving alphabetic and numeric input information. The input unit 140 also includes one or more function keys for configuring and controlling various functions of the mobile terminal 100. For example, the input unit 140 can include at least one of call button or input, video call button, call end button, a volume button for adjusting audio volume, a Bluetooth mode activation button, an alarm trigger signal transmission button, and an inquiry signal transmission quit button. The input unit 140 can be implemented with at least one of touchpad, touchscreen, normal keypad, and qwerty keypad or any other input device known in the art.

The display unit 130 displays visual data produced by an application running on the mobile terminal 100. The display unit 130 also displays user data input by the input unit 140, and displays operation state information and function configuration information of the mobile terminal 100. For example, the display unit 130 can display the booting progress screen, a standby mode screen, a menu screen, a video conference screen, a Bluetooth connection progress screen, and a discovered device list screen and other visual display data output from the first control unit 110. The display unit 130 also can display a PIN code input window for receiving the PIN code from the user. The PIN code is required for pairing with the target slave device 200 shown in FIG. 1. The display unit 130 can be configured such that, when an unavailable or incorrect PIN code is input in the pairing process, an unavailable PIN code alarm message is displayed on the display unit 130. The display unit 130 also can be configured to display an inquiry request menu. The inquiry request menu is for discovering Bluetooth devices within the Bluetooth radio range. The display unit 130 can also display an alarm request menu for transmitting the alarm trigger signal. The display unit 130 can be implemented with a Liquid Crystal Display (LCD) or Organic Light Emitting Diodes (OLED) or any other suitable display known in the art. In case that the display unit 130 is configured to support touch screen functions, a touch screen may serve as both the input unit 140 and the display unit 130.

The first Bluetooth unit 150 can transmit and receive a control signal and voice signal to and from a slave device, i.e. the headset 200 through a suitable wireless interface. The first Bluetooth unit 150 receives control signal (e.g., call request signal and call end signal) from the headset 200 and delivers the control signal to the first control unit 110. The first Bluetooth unit 150 can receive the identification information transmitted by the target Bluetooth device 200. The identification information includes a Bluetooth address data (BD_ADDR) as the unique address of the target Bluetooth device, Class of Device data, Page Scan Repetition Mode data, Page Scan Mode data, and Clock Offset data, etc. The first Bluetooth unit 150 can receive an error message notifying of the PIN code mismatch from the headset 200 and the master device 100. Particularly in an exemplary embodiment of the present disclosure, the first Bluetooth unit 150 can transmit an alarm trigger signal to the target slave device, e.g., the headset 200.

The first storage unit 120 stores one or more program instructions that form an operating system (OS) of the mobile terminal 100. The first storage unit 120 may also store one or more application programs for performing optional functions of the mobile terminal 110 (such as audio playback function, video functions including still and motion picture playback function, and broadcast playback function), and may store user data. The first storage unit 120 can store a Bluetooth application program for implementing a Bluetooth communication function. The first storage unit 120 also can stores the device list of the Bluetooth devices that have been found and/or that the master device 100 has connected with previously. The first storage unit 120 also can store the PIN code for use in pairing process with another Bluetooth device.

The first control unit 110 controls entire operations of the mobile terminal 100. The first control unit 110 also communicates and controls signals among internal function blocks of the mobile terminal 100. Particularly in an exemplary embodiment of the present invention, the first control unit 110 controls the inquiry signal when the Bluetooth function is activated for discovering Bluetooth devices. The inquiry signal is preferably broadcast for predetermined time duration.

During this time duration, the alarm trigger request message can be broadcast together with the inquiry signal. If an inquiry complete signal is input while broadcasting the inquiry signal, then the first control unit 110 controls the first Bluetooth unit 150 to stop broadcasting the inquiry signal. For example, if an LED (Light Emitting Diode) 231 of the slave device, i.e. headset 200, blinks upon receipt of the inquiry signal, the user of the mobile terminal 100 can recognize that the slave device has received the inquiry signal. The user can then input an inquiry complete request command that indicates that the search has been completed prior to the expiration of the inquiry time or the time that the inquiry signal has been broadcast. The first control unit 110 can be configured to control the first Bluetooth unit 150 to stop broadcasting the inquiry signal. This occurs upon the master device 100 detecting the input of the inquiry complete request command from the user.

If the inquiry response signal is received from the slave device 200 in response to the inquiry signal from the master device 100, then the first control unit 110 of the mobile terminal 100 can request that the slave device 200 transmits the inquiry response signal and that the slave device 200 also transmits the device identification information. Next, the first control unit 110 may output the model names of the slave device 200. These can be extracted from the identification information data and then displayed on the display unit 130 in the form of a device list. The first control unit 110 transmits an alarm trigger signal to the slave device selected from the device list. The mobile terminal 100 can be configured such that, when a specific device is selected from the device list, the first control unit 110 transmits the alarm trigger signal to the corresponding slave device 200 automatically. This provides the user with an indication of the correct slave device 200 if there are at least two of the same devices and it is difficult for the user to determine which slave device 200 has been paired with the master device 100. Also, the mobile terminal 100 can be configured such that, when an alarm trigger signal transmission command input is detected, the first control unit 110 controls the first Bluetooth module 150. The first control unit 110 may then transmit the alarm trigger signal to the corresponding slave device 200.

If a pairing command is detected, the first control unit 110 provides a control signal to establish a Bluetooth communication channel with the selected slave device 200 through a pairing process. In order to perform the pairing process, the first control unit 110 can control the Bluetooth unit 150 so that the PIN code stored in the storage unit 120 is transmitted to the corresponding slave device 200. If there is no PIN code stored in the first storage unit 120 or in the event of PIN code mismatch and the mismatch is detected, then the first control unit 110 controls the display unit 130 to output a PIN code input window. The PIN code input window is displayed on the display unit 130. It should be appreciated that the pairing process is well known to one of ordinary skill in the art and is omitted herein.

Although not depicted in the drawing, the mobile terminal 100 can further include at least one of a camera module (not shown). The camera module is adapted for capturing still and motion pictures. The mobile terminal 100 may also further include a local area wireless communication module (not shown), an audio playback module (not shown) such as MP3 module, and an Internet access module (not shown) for supporting Internet access. Although it is difficult to enumerate all of the functional components that can be conversed, aforementioned functional components and their equivalent devices can be incorporated into the mobile terminal 100.

Figure 2B:
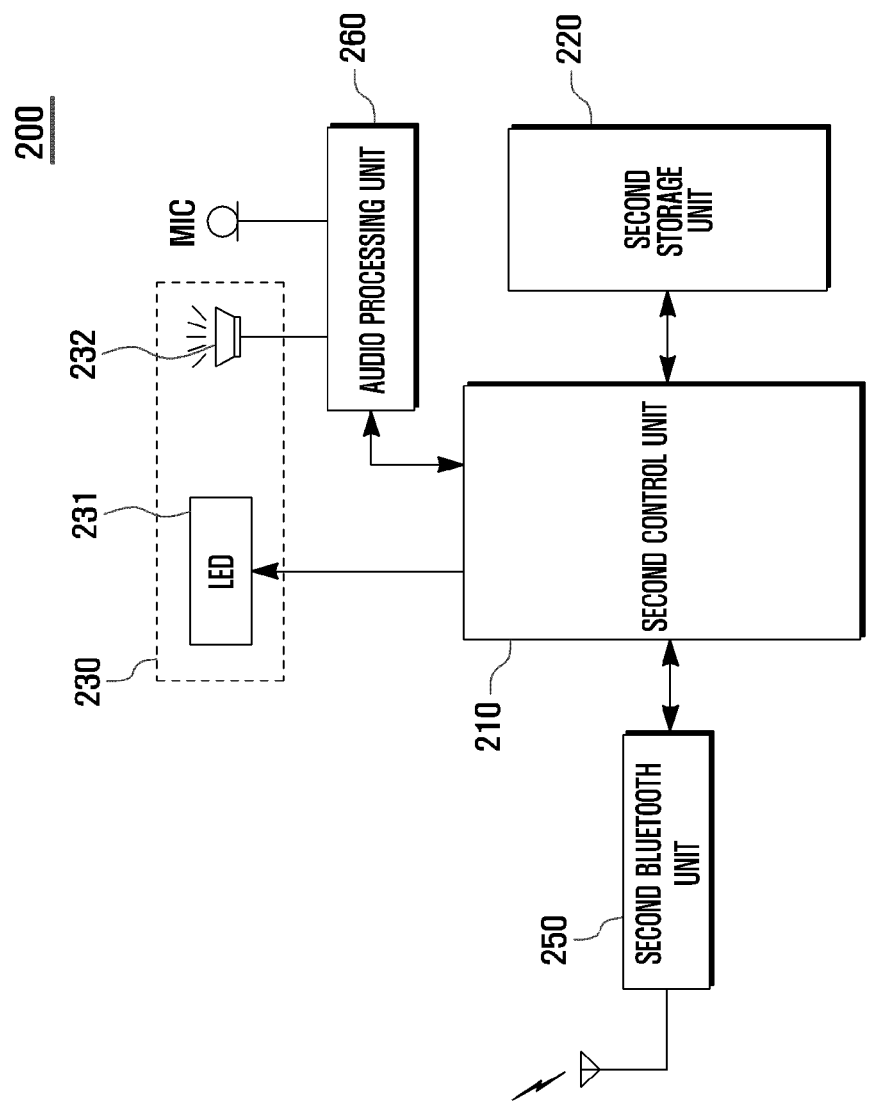
FIG. 2b is a block diagram illustrating a configuration of the headset of FIG. 1.

FIG. 2b is a block diagram illustrating a configuration of the headset of FIG. 1. As shown in FIG. 2b, the headset 200 includes a second Bluetooth unit 250, a second control unit 210, a second storage unit 220, an alarm unit 230, and an audio processing unit 260.

If at least one of the inquiry signal and the alarm trigger signal is received from the mobile terminal 100, the above structured headset 200 activates the alarm unit 230. The alarm unit 230 in response then outputs at least one of a visual alarm, an auditory alarm, or a tactile alarm such that the user can recognize that the slave device 200 (i.e., headset 200) has successfully received the signal. The internal components of the headset 200 are described hereinafter in detail.

The audio processing unit 260 converts the digital audio signal received from the mobile terminal 100 to an analog audio signal. The analog audio signal then is output through a speaker 232 in the form of audible sound wave. Also, the audio processing unit 260 preferably converts the analog audio signal input through a microphone (MIC) to a digital audio signal. The digital audio signal is then output to the second control unit 210.

The second Bluetooth unit 250 can also transmit/receive control signals and voice signals to/from the mobile terminal 100. For example, the second Bluetooth unit 250 can transmit an inquiry response signal. The inquiry response signal is transmitted in response to the inquiry signal transmitted by the mobile terminal 100 under the control of the second control unit 210. The headset 200 can be configured such that, when an identification information request signal is received from the mobile terminal 100, then the second Bluetooth unit 250 of the headset 200 transmits the identification information data. The identification information data may include a Bluetooth address data (BE_ADDR) as the unique address of the device, a Class of Device data, a Page Scan Repetition Mode data, a Page Scan Mode data, a Clock Offset data, and a Model name of the device. The second Bluetooth unit 250 also can receive the pairing request signal transmitted by the mobile terminal 100. At this time, the second Bluetooth unit 250 can received a PIN code from the mobile terminal 100. Particularly in an exemplary embodiment of the present disclosure, the second Bluetooth unit 250 can receive the alarm trigger signal transmitted by the mobile terminal 100 and deliver alarm trigger signal to the second control unit 210 in response thereto.

The second storage unit 220 stores programs and information required for operating the headset 200. The second storage unit 220 also stores a unique PIN code of the headset 200. Here, the PIN code can be stored at the manufacturing stage of the headset 200 with a default value of "0000" or "1234" or the like. The second storage unit 220 also can store the unique Bluetooth address data (BD_ADDR), Class of Device data, Page Scan Repetition Mode data, Page Scan Mode data, Clock Offset data, and Model name of the device.

The alarm unit 230 is a module for outputting at least one of visual, auditory, and tactile alarms. The alarm is for attracting user's attention such that the user can recognize the headset 200 as the device selected from the device list displayed on display unit 130 of the mobile terminal 100. The alarm unit 230 can include at least one of an LED 231 for outputting a visual alarm, a speaker 232 for outputting an auditory alarm, and/or a suitable vibration motor (not shown) for outputting a tactile alarm. For example, the LED 231 of the alarm unit 230 can be configured to blink for a predetermined time duration, when at least one of the inquiry signal and alarm trigger signal is received. The LED 231 is preferably suitable to receive control signals and be under the control of the second control unit 210. The speaker 232 of the alarm unit 230 can be configured to output an audio sound for predetermined time duration. Speaker 232 is preferably also suitable to receive control signals and is under the control of the second control unit 210. The vibration motor (not shown) of the alarm unit 230 can be configured to generate vibration for a predetermined time duration. Motor (not shown) also preferably is suitable to receive a control signal and is preferably under the control of the second control unit 210.

The second control unit 210 controls entire operations of the headset 200. The second control unit 210 controls the second Bluetooth unit 250 to receive the inquiry signal transmitted by the mobile terminal 100. The second control unit 210 controls the second Bluetooth unit 250 to transmit an inquiry response message to the mobile terminal 100 in response to the inquiry signal. If the identification information request signal is received from the mobile terminal 100, then the second control unit 210 controls the second Bluetooth unit 250 to transmit the identification information. The identification information may include the model name of the headset 200 and other data. If the pairing request signal with the PIN code is received from the mobile terminal 100, then the second control unit 210 compares the received PIN code with the PIN code stored in the second storage unit 220. The second control unit 210 then controls the second Bluetooth unit 250, when the PIN code received and the stored PIN code are matched, to establish a Bluetooth communication channel with the mobile terminal 100.

If the received and stored PIN codes do not match, then the second control unit 210 can control the second Bluetooth unit 250 to transmit an error message to the mobile terminal 100. Particularly in an exemplary embodiment of the present disclosure, if the inquiry signal transmitted by the mobile terminal 100 is received by means of the second Bluetooth unit 250, then the second control unit 210 activates the alarm unit 230 to output at least one of visual, auditory, and tactile alarms such that the user can identify the Bluetooth headset 200 as the target device. If the alarm trigger signal is received from the mobile terminal 100, then the second control unit 210 activates the alarm unit 230 to output at least one of visual, auditory, and tactile alarms such that the user can identify the Bluetooth headset 200 as the target device, which is advantageous as less battery power can be used to pair devices 100 and 200 and convenience for the user can be achieved.

The structures and operations of the Bluetooth communication system according to an exemplary embodiment of the present disclosure has been described hereinabove. A description is made of a Bluetooth connection establishment method hereinafter.

Figure 3:
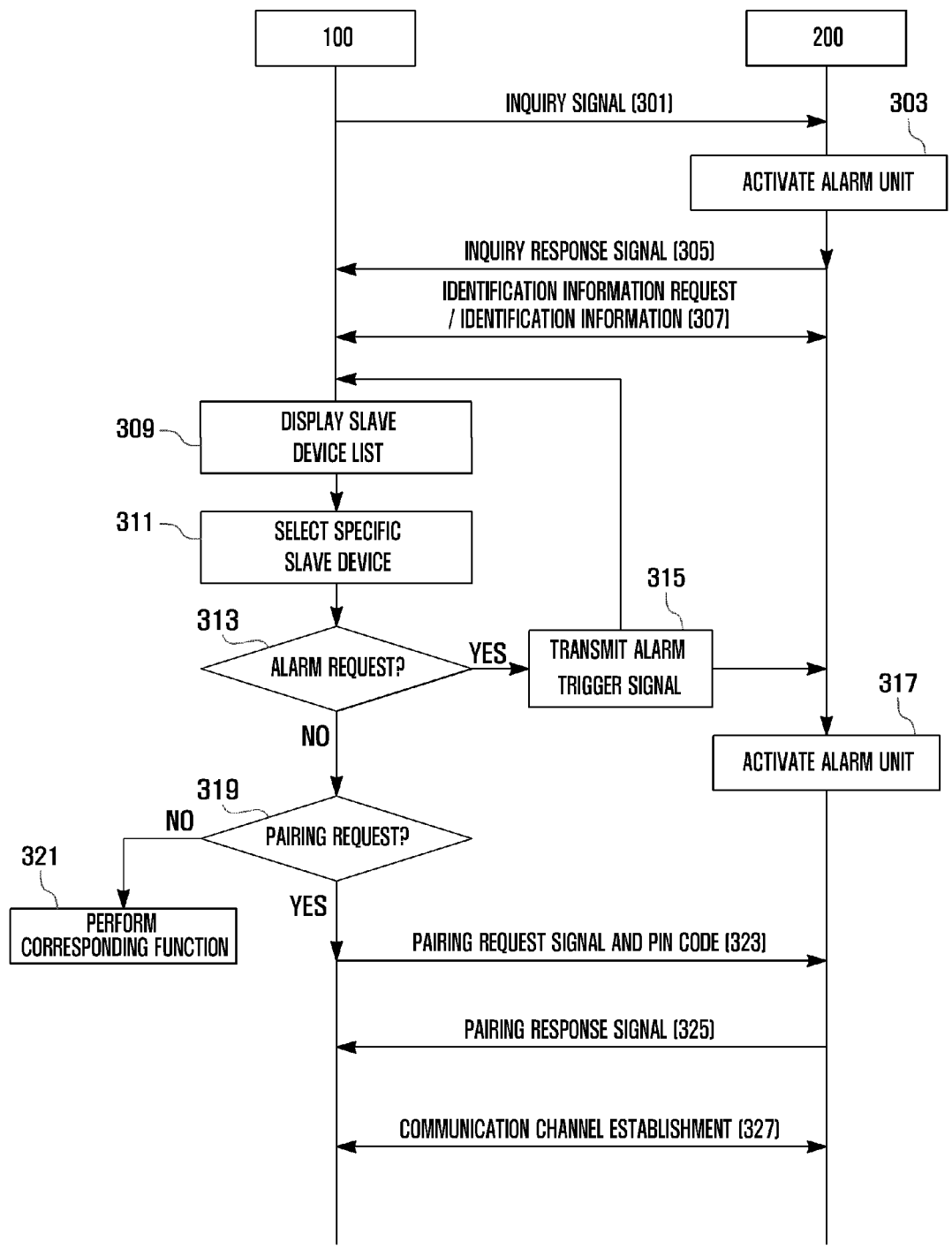
FIG. 3 is a flowchart illustrating a Bluetooth connection establishment method for a Bluetooth communication system according to an exemplary embodiment of the present disclosure.

FIG. 3 is a flowchart illustrating a Bluetooth connection establishment method for a Bluetooth communication system according to an exemplary embodiment of the present disclosure. It should be appreciated that the method steps shown herein may be provided at the same time or in a different order and various configurations are possible and within the scope of the present disclosure.

Referring to FIGS. 1 through 3, once the Bluetooth mode is activated and device discovery request is detected, the mobile terminal 100 broadcasts an inquiry signal for a predetermined time duration (301). If the inquiry signal is received, then the slave device (i.e. headset 200) activates the alarm unit 230 to output a first alarm (303). The first alarm can be output in the form of blinking of the LED 231 or an audible sound wave through the speaker 232 for a predetermined time duration. In case that a vibration mode (not shown) is included in the alarm unit 230, the first alarm can be output in the form of vibration produced by the vibration motor.

After outputting the first alarm, the headset 200 transmits an inquiry response signal to the mobile terminal 100 in response to the inquiry signal (305). If the inquiry response signal is received, then the mobile terminal 100 requests that the headset 200 transmit the inquiry response signal to transmit identification information. The mobile terminal 100 then receives the identification information transmitted by the headset 200 (307). The identification information can include the unique Bluetooth Address data (BE_ADDR), Class of Device data, Page Scan Repetition Mode data, Page Scan Mode data, Clock Offset data, and Model Name data of the headset 200.

Upon receipt of the identification information, the mobile terminal 100 displays the model name extracted from the identification information (309). In case that a plurality of slave devices have transmitted the identification information, then the mobile terminal 100 displays the device list of the slave devices transmitted the identification information. In this manner, the user can select one of the slave devices from the device list by manipulating navigation keys of the input unit 140 or by a touch input by means of the touch screen formed on the display unit 130 (311). The description is made herein is under the assumption that the headset 200 is selected by the user using the input device.

Once a slave device 200 has been selected from the slave device list, then the mobile terminal 100 determines whether an alarm trigger signal transmission command is detected (313). If an alarm trigger signal transmission command is detected, then the mobile terminal 100 transmits an alarm trigger signal to the headset 200 (315). Thereafter, control of the method passes to step 309. The mobile terminal 100 can be configured, when a specific device is selected from the slave device list, to transmit the alarm trigger signal to the selected device automatically. The mobile terminal 100 also can be configured, when an alarm trigger signal transmission command is detected, to transmit the alarm trigger signal to the selected device. If the alarm trigger signal is received, the headset 200 activates the alarm unit 230 to output a second alarm (317).

If no alarm trigger signal transmission command is detected at step 313, then the mobile terminal 100 determines whether a pairing request command is detected (319) at a decision. If no pairing request command is detected, then the mobile terminal 100 executes a corresponding function (321). For example, the mobile terminal 100 may repeat step 309 and end the Bluetooth mode to enter idle state in response to a Bluetooth mode termination command.

If a pairing request command is input at step 319, the mobile terminal 100 transmits a pairing request signal to the headset 200 (323). At this time, the pairing request signal can be transmitted along with the PIN code stored in the first storage unit 120 of the mobile terminal 100. If the pairing request signal and PIN code are received, then the headset 200 compares the received PIN code with the PIN code stored in the second storage unit 220. The headset 200 then transmits, if the PIN codes match with each other, a pairing response signal (325). If the pairing response signal is received, the mobile terminal 100 establishes a Bluetooth communication channel with the headset 200 (327).

If the received and stored PIN codes do not match with each other, then the headset 200 can transmit an error message to the mobile terminal 100. If the error message is received, then the mobile terminal 100 can transmit another PIN code stored in the first storage unit 120 or then display a PIN code input window on the display unit 130 to receive a new PIN code.

Thereafter, the mobile terminal 100 may transmit the second new or corrected PIN code through the PIN code input window to the headset 200.

If it is recognized that the target slave device, i.e. the headset 200, has received the inquiry signal, then the user can request that the mobile terminal 100 stop transmission of the inquiry signal before the expiration of the duration of the inquiry signal transmission interval. This reduces waste due to continued searching and conserves battery power of the mobile terminal 100 for the unnecessary device discovery.

The mobile terminal 100 can transmit the alarm trigger signal to the headset 200 after the Bluetooth communication channel has been established through the pairing process. In this case, the headset 200 controls the alarm unit 230 to output a third alarm upon receipt of the alarm trigger signal. Accordingly, the user can check the location of the slave device 200 with the third alarm even when the slave device 200 has been lost.

Figure 4:
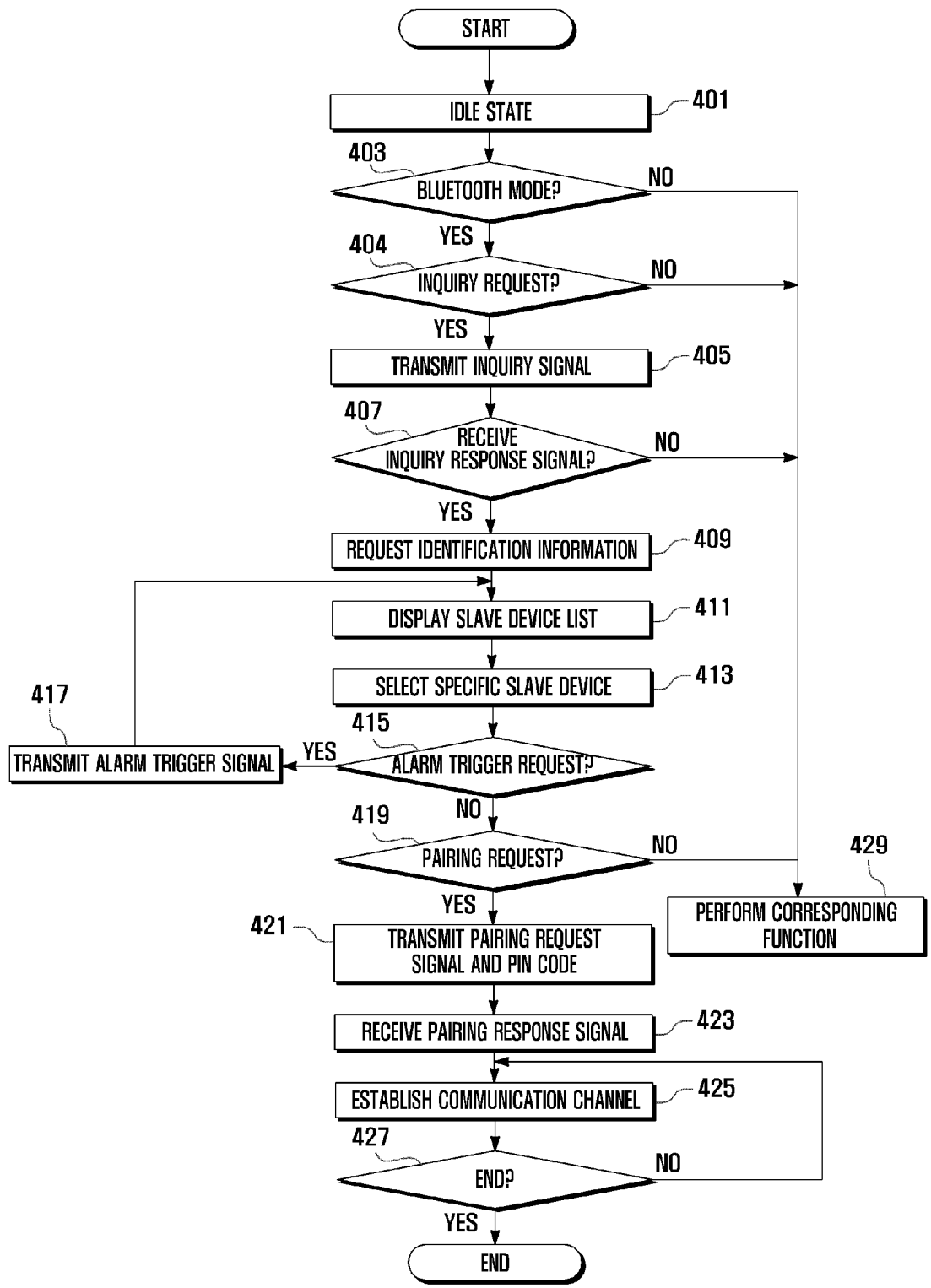
FIG. 4 is a flowchart illustrating a Bluetooth connection establishment method for the mobile terminal of FIG. 1.

FIG. 4 is a flowchart illustrating a Bluetooth connection establishment method for the mobile terminal of FIG. 1. Referring to FIG. 4, the method commences and passes to step 401. The first control unit 110 controls one or more components of the mobile terminal 100 such that the mobile terminal 100 enters idle state after booting up (401). While the mobile terminal 100 is running in idle state, the first control unit 110 determines whether the Bluetooth mode is activated (403). If the Bluetooth mode is activated, then the first control unit 110 determines whether an inquiry request command is detected (404). If no inquiry request command is detected, then the first control unit 110 performs a corresponding function (429). For example, the first control unit 110 can request for a connection establishment with the slave device 200 with which the communication channel has been established previously. Otherwise, if an inquiry request command is detected, then the first control unit 110 controls the first Bluetooth unit 150 to broadcast an inquiry signal during predetermined time. (405). At this time, the inquiry signal can include an alarm trigger signal.

After transmitting the inquiry signal, the first control unit 110 monitors a predetermined area to detect an inquiry response signal transmitted by any slave device in response to the inquiry signal (407). If no inquiry response signal is received at step 407, then the first control unit 110 can perform a corresponding function (429). For example, the first control unit 110 can control one or more components of the mobile terminal 100 such that an alarm message notifying the user of no available slave device is displayed on the display unit 130. If an inquiry response signal is received at step 407, then the first control unit 110 controls one or more components of the mobile terminal 100 to transmit an identification information request signal to the slave device 200 which has transmitted the inquiry response signal. The mobile terminal 100 then receives the identification information transmitted by the corresponding slave device (409).

Next, the first control unit 110 displays a slave device list on the display unit 130 (411). The first control unit 100 then detects a device selection command input by the user (413). The device selection command can be input by user's touch gesture on the display unit 130 when the display unit 130 is implemented to support touch screen function or by an input key or the like.

Next, the first control unit 110 determines whether an alarm trigger signal transmission command is input (415). If an alarm trigger signal transmission command is input, then the first control unit 110 transmits an alarm trigger signal to the selected slave device upon detection of the alarm trigger signal transmission command (417). The method then passes to step 411. The alarm trigger signal transmission command can be generated automatically when a specific slave device 200 is selected from the slave device list. The alarm trigger signal transmission command also can be generated in response to a user command input by the input unit 140.

If no alarm trigger signal transmission command is input, then the first control unit 110 determines whether a pairing request command is input (419). If no pairing request command is input, then the first control unit 110 performs a corresponding function (429). For example, the first control unit 110 ends the Bluetooth mode in response to a Bluetooth mode termination command input, and the procedure passes to step 401. The method also can be configured to go to step 411 to display the slave device list.

If a pairing request command is input at step 419, then the first control unit 110 transmits a pairing request signal with a PIN code. The pairing request signal with the PIN code is transmitted to the corresponding slave device 200 upon detection of the pairing request command (421). The mobile communication terminal 100 then receives a pairing response signal transmitted by corresponding slave device (423). Next, the first control unit 110 establishes a communication channel with the corresponding slave device (425). Although not shown in FIG. 4, the mobile terminal 100 can transmit the alarm trigger signal to the corresponding slave device 200 after the Bluetooth communication channel has been established with the slave device 200.

After establishing the Bluetooth communication channel with the corresponding slave device 200, the first control unit 110 monitors to detect whether a termination command is input (427). If no termination command is detected, then the first control unit 110 controls one or more components of the mobile communication terminal 100 such that the method returns to step 425. If a termination command is detected at step 427, then the first control unit 110 ends the Bluetooth mode such that the mobile terminal 100 enters the idle state. In case that the termination command releases the Bluetooth communication channel, then the first control unit 110 can control one or more components of the mobile communication terminal 100 such that the Bluetooth communication channel with the slave device 200 is released and then the method returns to step 411.

Figure 5:
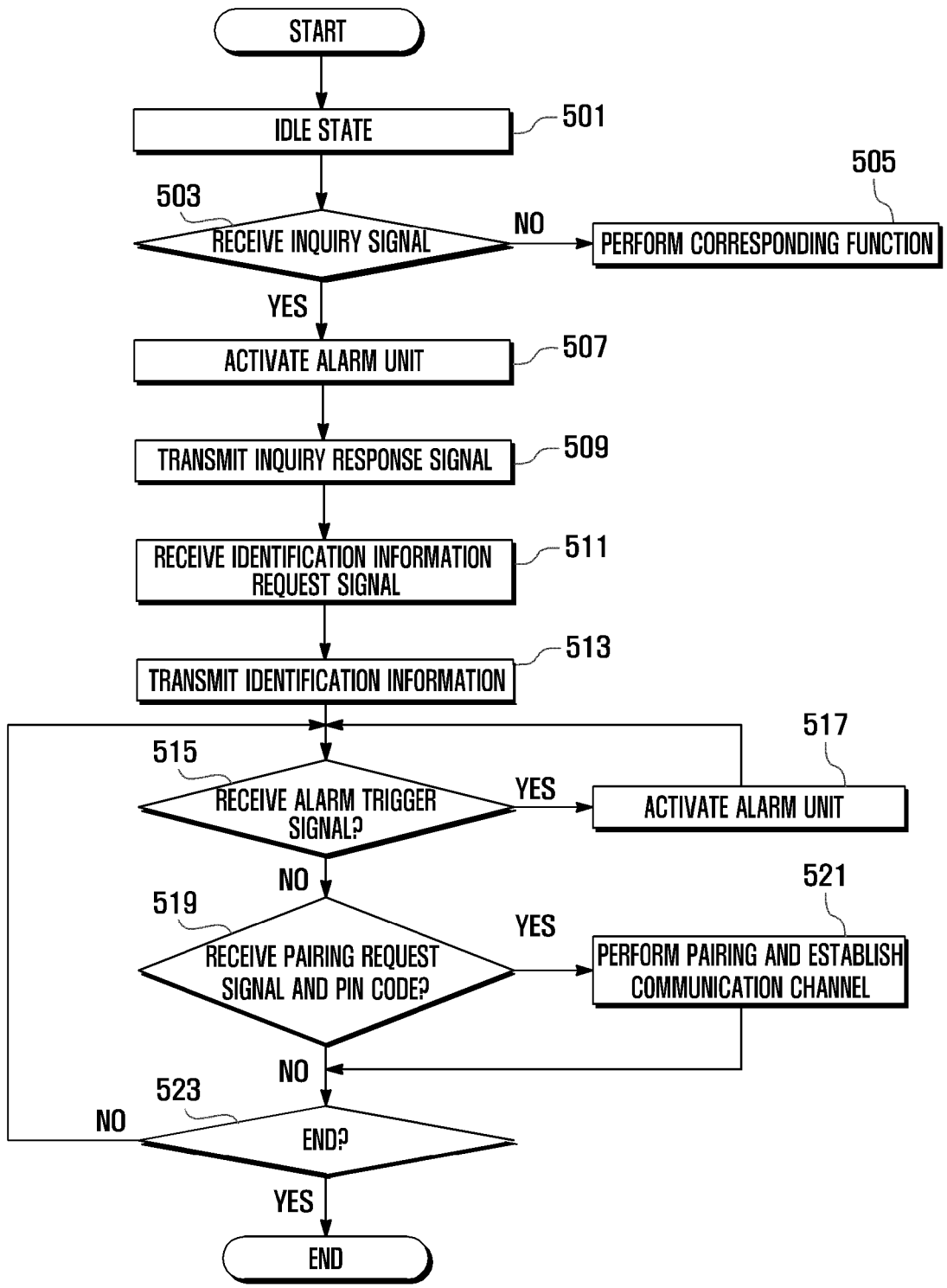
FIG. 5 is a flowchart illustrating a Bluetooth connection establishment method for the headset of FIG. 1.

FIG. 5 illustrates a flowchart illustrating a Bluetooth connection establishment method for the headset 200 of FIG. 1. Referring to FIGS. 1 through 5, the second control unit 210 of the headset 200 controls one or more components of the headset 200 such that the headset 200 enters an idle state after booting up (501). While the headset operates in idle state, the second control unit 210 monitors the predetermined area to detect receipt of an inquiry signal (503) from a mobile communication terminal 100 or the like. If no inquiry signal is received, then the second control unit 210 performs a corresponding function (505). For example, the second control unit 210 controls one or more components of the headset 200 such that the idle state is maintained. Also, the headset 200 can be configured to switch from slave device to master device and broadcast the inquiry signal for discovering other devices within its Bluetooth radio range. Various device 200 configurations are possible and within the scope of the present disclosure.

If an inquiry signal is received at step 503, then the second control unit 201 activates the alarm unit 230 to output a first alarm (507). The alarm unit 230 can include at least one alarm being made from the LED 231, the speaker 232, and the vibration motor (not shown). When the inquiry signal is received, then the second control unit 201 can control the LED 231 to turn on or blink for a predetermined time duration. The second control unit 210 also can control the speaker 232 to output a predetermined audio sound for a predetermined time duration upon detecting the inquiry signal. The second control unit 210 also can control the vibration motor (not shown) to generate vibration for a predetermined time duration upon detecting the receipt of the inquiry signal. The user can identify the headset (i.e., location of the headset or receipt of the inquiry signal at the headset) by at least one of visual, audible, and tactile alarms.

After outputting the first alarm, the second control unit 210 transmits an inquiry response signal to the mobile terminal 100 in response to the inquiry signal (509). Next, the second control unit 210 receives an identification information request signal from the mobile terminal 100 (511) and transmits the identification information to the mobile terminal 100 in response to the identification information request signal (513).

Next, the second control unit 210 controls the second Bluetooth unit 250 to monitor receipt of an alarm trigger signal (515). If an alarm trigger signal is received by the second Bluetooth unit 250, then the second control unit 210 activates the alarm unit 230 to generate a second alarm (517) and returns the procedure to step 515. If no alarm trigger signal is received at step 515, then the second control unit 210 determines whether a pairing request signal and a PIN code are received (519). If the pairing request signal and PIN code are received, then the second control unit 210 performs pairing process to establish a communication channel (521) between the mobile communication terminal 100 and the slave device 200. Although not depicted in FIG. 5, when the received PIN code does not match with the PIN code stored in the second storage unit 220, then the second control unit 210 controls one or more components of the slave device 200 to transmit an error message to the mobile terminal 100. Although not depicted in FIG. 5, the second control unit 210 can activate the alarm unit 230 to output a third alarm. The third alarm may be indicative if the alarm trigger signal is received from the mobile terminal 100 even after the Bluetooth communication channel has been established with the mobile terminal 100. With the third alarm, the user can recognize the location of the slave device 200 being connected to the mobile terminal 100.

After establishing the Bluetooth communication channel with the mobile terminal 100, the second control unit 210 monitors the predetermined space to detect an input of a termination signal (523). If no termination signal is detected, then the second control unit 210 controls one or more components to return the procedure to step 515. If a termination signal input is detected, the second control unit 210 releases the Bluetooth communication channel with the mobile terminal 100 to end the Bluetooth communication between the mobile communication device 100 and the slave device 200.

As described above, the Bluetooth connection establishment method and system of the present disclosure notifies the user of the receipt of the inquiry signal at the target slave device 200 with at least one of visual, audible, and tactile alarm such that the user can identify the target Bluetooth device and stop the master device's 100 broadcast of the inquiry signal. The present disclosure results in reduction of waste of the device's discovery time and power consumption and conserves battery life. Also, the Bluetooth connection establishment method and system of the present disclosure enables the master device to transmit an alarm trigger signal to a target slave device among the discovered devices. The alarm trigger signal provides that the user can easily identify the target slave device with at least one of visual, auditory, and tactile alarm output in response to the alarm trigger signal. The alarm trigger signal thereby results in improvement of user's convenience.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

Although exemplary embodiments of the present invention have been described in detail hereinabove, it should be clearly understood that many variations and/or modifications of the basic concepts herein taught which may appear to those skilled in the present art will still fall within the spirit and scope of the present disclosure, as defined in the appended claims.

What is claimed is:

1. A method for establishing a connection, comprising:
transmitting an inquiry signal for discovering at least one slave device;
transmitting an inquiry response signal, the inquiry response signal being communicated from the at least one slave device to a master device, the inquiry response signal indicating that the inquiry signal has been received by the at least one slave device;
requesting, at the master device, that the at least one slave device transmit identification information;
displaying a slave device list including the at least one slave device that transmitted the inquiry response signal;
outputting a first alarm by the at least one slave device that received the inquiry signal; and
outputting a second alarm by a target slave device selected from the slave device list in response to an alarm trigger signal transmitted by the master device.

2. The method of claim 1, wherein the alarm trigger signal is transmitted automatically to the target slave device, when the target slave device is selected from the slave device list.

3. The method of claim 1, wherein the alarm trigger signal is transmitted in response to an alarm request command, and wherein the alarm request command is input using an input device associated with the master device.

4. The method of claim 1, wherein the first alarm or the second alarm comprises at least one of a blinking light emitted from a light emitting diode, an audio signal emitted via a speaker, a tactile signal and any combination thereof.

5. The method of claim 1, further comprising:
establishing a communication channel with the selected target slave device;
transmitting an alarm trigger signal from the master device to the selected target slave device with which the communication channel is established; and
outputting, at the selected target slave device, a third alarm in response to the alarm trigger signal.

6. A system for establishing a connection, comprising:
a master device transmitting an inquiry signal for discovering at least one slave device; and
a first slave device that receives the inquiry signal and transmits an inquiry response signal to the master device, wherein the master device requests an identification information to the at least one slave device, receives an identification information from the at least one slave device, outputs a slave device list associated with the at least one slave device on a display, and transmits an alarm trigger signal to a target slave device selected from the slave device list on the display; and the first slave device outputs an alarm upon receipt of at least one of the inquiry signal and the alarm trigger signal.

7. The system of claim 6, wherein the master device comprises:

a first radiofrequency unit which performs communication with wireless devices;

a first control unit which controls the first radiofrequency unit to broadcast the inquiry signal and to receive the inquiry response signal and the identification information of the at least one slave device.

8. The system of claim 7, wherein the first control unit transmits an alarm trigger signal to the first slave device when the first slave device is selected from the device list.

9. The system of claim 7, wherein the master device further comprises an input unit to activate and transmit the alarm trigger signal.

10. The system of claim 9, wherein if the alarm trigger signal is selected by the input unit, the first control unit controls the first radiofrequency unit to transmit the alarm trigger signal to the first slave device.

11. The system of claim 6, wherein the first slave device comprises:

a second radiofrequency unit which performs wireless communication;

a second control unit controlling the second radiofrequency unit to transmit the inquiry response signal to the master device in response to the inquiry signal and to transmit the identification information to the master device in response to an identification information request; and an alarm unit which outputs the alarm in response to at least one of the inquiry signal and the alarm trigger signal.

12. The system of claim 11, wherein the alarm unit comprises at least one of a visual alarm, an audible alarm and a tactile alarm.

13. The system of claim 11, wherein the second control unit activates the alarm unit in response to the alarm trigger signal, the alarm trigger signal being received after a wireless communication channel is established with the master device.

14. A system for establishing a connection comprising:

a first device comprising a first controller, a first memory, an input device, a display, and a first radiofrequency communication device;

a second device comprising a second controller, a second memory, a second radiofrequency communication device and an indicator;

the first device communicating an inquiry signal to the second device;

the second device communicating in response to the inquiry signal a second signal, the second signal being an inquiry response signal;

the display outputting data associated with second device and at least a third device;

wherein upon selecting the second device on the display an alarm request signal is transmitted from the first device to the second device and in response to the alarm request signal the second device provides an indication; and wherein upon selecting the third device on the display an alarm request signal is transmitted from the first device to the third device and in response to the alarm request signal the third device provides the indication.

15. The system of claim 14, further comprising pairing the first and the second device for wireless communication according to a protocol.

16. The system of claim 15, further comprising pairing the first and the third device for wireless communication according to a protocol.

17. The system of claim 14, further comprising providing the indication as a visual, audible or tactile indication.

18. The system of claim 14, wherein the indicator comprising at least one of a light emitting diode, a speaker and a vibration device.

19. The system of claim 14, further comprising providing a pairing request signal from the first device to the second device, the pairing request signal comprising an identification, and the second device in response to the pairing request providing a pair response signal, and wherein the first and the second device communicate via a channel.

20. The system of claim 14, wherein the first device is a mobile device, and wherein the second device is an accessory to the mobile device, and wherein the display is the input device.

21. A method for establishing a connection comprising:

transmitting an inquiry signal for discovering a first device;

transmitting an inquiry response signal, the inquiry response signal being communicated from the first device to a second device, the inquiry response signal indicating that the inquiry signal has been received by the first device;

requesting, at the second device, that the at least one first device transmit identification information to pair with the second device; and outputting an alarm in response to an alarm trigger signal transmitted by the first or the second device.

* * * * *